:# 3,813,414
PREPARATION OF COUMARIN
Samuel Kahn, Rutherford, N.J., assignor to Universal Oil Products Company, Des Plaines, Ill.
No Drawing. Filed June 30, 1972, Ser. No. 267,776
Int. Cl. C07d 7/28
U.S. Cl. 260—343.2 R                  12 Claims

ABSTRACT OF THE DISCLOSURE

Preparing coumarin by reacting salicylaldehyde and and acetic anhydride in contact with preformed alkali metal biacetate.

BACKGROUND OF THE INVENTION

The Perkin reaction is described in the literature for the preparation of coumarin by the reaction of salicylaldehyde and acetic anhydride with an alkali metal acetate. Various modifications are proposed in the prior art for improving the process, both in increased yields and purity of the coumarin, as well as to facilitate the separation and recovery of the coumarin.

DESCRIPTION OF THE INVENTION

The present invention is predicated on the discovery that high yields of high purity coumarin are obtained when the reaction of salicylaldehyde and acetic anhydride is effected in contact with preformed alkali metal biacetate. Furthermore, improvement in the sepration and recovery of the coumarin product also is accomplished.

As hereinbefore set forth, these improved results are obtained when the reaction is effected in contact with an alkali metal biacetate. Any suitable alkali metal biacetate may be used and preferably comprises sodium biacetate, potassium biacetate or a mixture thereof. Other alkali metal biacetates comprise lithium biacetate, cesium biacetate, rubidium biacetate, mixture thereof or mixture with sodium and/or potassium biacetate. Sodium biacetate also may be named as sodium acetate acetic acid salt (NaOAc·HOAc) or sodium hydrogen diacetate [NaH(OAc)$_2$] where Ac represents the acetyl radical

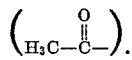

The alkali metal biacetate is readily prepared by reacting substantially equal molar proportions of an alkali metal acetate and acetic acid at a temperature of from about 100° to about 145° C. While a higher temperature may be used, it generally is not required because the mass becomes completely liquid when the temperature reaches 145° C. and provides a stirrable mass at a temperature somewhat below that at which refluxing occurs. Sodium biacetate is in the form of a liquid complex at above about 145° C. and does not decompose appreciably below 225° C. at atmospheric pressure.

The reaction of salicylaldehyde and acetic anhydride in contact with the alkali metal biacetate is effected in any suitable manner. For simplification purposes, the following description will be directed to the use of sodium biacetate, with the understanding that the other alkali metal biacetates or mixture thereof may be similiarly uti ized. The sodium biacetate is prepared as a first step in the process and conveniently is prepared in the same reactor to be used for the remaining reaction. However, when desired, the sodium biacetate may be prepared externally and then charged into the reactor. Generally, approximately equal molar amounts of acetic acid and sodium acetate are utilized, although a slight excess of acetic acid may be used when desired. In one example, 1 mole of sodium acetate and 1.1 moles of acetic acid are first reacted in the reactor, and then the salicylaldehyde and acetic anhydride are added thereto. The sodium biacetate will be used in any suitable concentration and may comprise from about 0.2 to 1.0 or more and preferably from about 0.25 to about 0.5 molar proportions of sodium biacetate per 1 molar proportion of salicylaldehyde.

The acetic anhydride and salicylaldehyde should be used in a molar ratio of at least 2:1 and generally will not exceed a molar ratio of about 4:1. In a preferred embodiment, a mixture of the salicylaldehyde and acetic anhydride is added to the sodium biacetate at a temperature within the range of from about 160° to about 225° C. and preferably from about 170° to about 190° C., while removing acetic acid as formed. In one example, the mixture of salicyladehyde and acetic anhydride was added to the sodium biacetate over a period of 7 hours at a temperature of 175°–180° C. The time of adding the mixture may range from about 1 to about 15 hours. Some acetic anhydride will be distilled over with the acetic acid. Preferably additional acetic anhydride is again added to the reaction zone to compensate for the evolved acetic anhydride. The reaction mixture preferably is maintained at reaction temperature for an additional ½ to 2 hours but generally not much in excess of this time.

Following completion of the reaction, the coumarin is recovered in any suitable manner. While this may be accomplished by direct distillation or by adding a solvent to precipitate sodium acetate which is recovered by filtration and reused, followed by distillation to recover coumarin from the filtrate, a preferred method is to first distill under vacuum to remove acetic acid which had been tied up in the biacetate, followed by a filtration or water wash. The biacetate is dissociated during the vacuum distillation at a temperature of from about 120° to about 140° C., whereas atmospherically it dissociates at a temperature above 225° C. Any suitable vacuum may be used and may be within the range of from about 1 mm. to about 300 mm. and preferably from about 5 mm. to about 100 mm. of Hg. Another advantage to this method is that when a water wash is used only a small amount of water (from about 0.5 to about 1.0 parts of water per 1.0 part of sodium acetate released from the biacetate) is required, in contrast to the large volume of water wash which otherwise may be needed. While distillation without washing has been proposed as an advantage in the prior art, this is questionable since solids precipitate during the vacuum distillation causing poor heat transfer and burning onto the reactor, with some decomposition which adversely affects the quality of the recovered coumarin.

As another important advantage to the process of the present invention, the sodium biacetate is readily dissociated by distillation under vacuum at a temperature of from about 120° to about 140° C. This results in the ready recovery of acetic acid and sodium acetate, both of which may be reused within the process, thereby providing additional economies in the operation thereof.

As hereinbefore set forth and as will be demonstrated in the following examples, the improved method of the present invention produces high yields of high purity coumarin.

The following examples are introduced to illustrate further the novelty and utility of the present invention but not with the intention of unduly limiting the same.

EXAMPLE I

Sodium biacetate was prepared by adding in portions 82 gms. (1.0 moles) of sodium acetate to 66 gms. (1.1 moles) of acetic acid at a temperature of about 100° C. with continual increase of the temperature while the sodium acetate is being added to provide a stirrable mass at a temperature somewhat below that at which refluxing occurs. When the temperature reaches 145° C., the mass becomes completely liquid and most of the sodium acetate has been added. At a temperature of 175°–180° C., a mixture of 612 gms. (6.0 moles) of acetic anhydride and 366 gms. (3.0 moles) of salicylaldehyde was added over a period of 7 hours, while distilling acetic acid. The reaction mixture was kept at a temperature of 180° C. for an additional ½ hour until no more acetic acid distilled overhead. An analysis of the distillate indicated that about 40 gms. of acetic anhydride had distilled over with the acetic acid. The system was compensated by adding an additional 40 gms. of acetic anhydride in ½ hour at 175°–180° C. while distilling out acetic acid. Following completion of the reaction, the reaction mixture was cooled to 110° C. and additional acetic acid was distilled out at a pot temperature up to 180° C. at 43 mm. Hg. A total of 680 gms. of acetic acid containing approximately 6% acetic anhydride was recovered in the operation.

The reaction mixture was cooled to 80° C., filtered and the cake washed with toluene until clear of crude. The cake on drying weighed 81.5 gms. and assayed 98.2% as sodium acetate. The sodium acetate recovered in this filtration procedure is satisfactory for reuse in a subsequent charge, thus providing additional economies. The total filtrate was distilled, recoverying, after removal of toluene, 405 gms. of distillate on high vacuum (3–5 mm.). Analysis of GLC of the distillate indicated a purity of 88.5% and an indicated conversion of about 81.5%. As will be seen, this represents a high conversion to high purity coumarin.

EXAMPLE II

Another run was made in substantially the same manner as described in Example I except that mixed sodium-potassium biacetates were used instead of the sodium biacetate. The mixed biacetates were prepared by reacting a mixture of sodium acetate and potassium acetate in 45:55 molar ratio with acetic acid. Otherwise, the run was made in substantially the same manner as described in Example I. The use of the mixed biacetates increased the conversion to 85.5%.

EXAMPLE III

In the preparation described in Example I, the sodium biacetate was used in a molar proportion of about 0.33 per 1 molar proportion of salicylaldehyde. However, in another run made in substantially the same manner as described in Example I except that the sodium biacetate concentration was halved, the conversion was lowered by about 7%. On the other hand, doubling the concentration of sodium biacetate had no significant effect on the conversion. Accordingly, in this particular system, the sodium biacetate should be used in a molar proportion to salicylaldehyde of above 1:6. However, for economy reasons, this proportion should not exceed about 1:1.5 of sodium biacetate to salicylaldehyde.

EXAMPLE IV

In the preparation of Example I, the amount of acetic anhydride (40 gms.) distilled over with the acetic acid was compensated for by the charging of an additional 40 gms. of acetic anhydride. In another run conducted in substantially the same manner as described in Example I, except that the additional 40 gms. of acetic anhydride was not charged, the conversion dropped to 72.6%. Accordingly, it is of definite advantage to replace the acetic anhydride lost overhead with the acetic acid.

EXAMPLE V

Another run was made in substantially the same manner as described in Example I except that all of the salicylaldehyde was added to the sodium biacetate in the beginning, followed by the addition of the acetic anhydride over a period of 7 hours. In this run, the conversion dropped to 68–69% and the residue increased about threefold. Accordingly, it is preferred that the salicylaldehyde and acetic anhydride are added as a mixture over a period of time.

EXAMPLE VI

In Example I, the cooled mass free of substantially all the acetic acid was filtered and the cake washed with toluene. In another run made in substantially the same manner, the cooled mass was washed with 0.73 parts of water per 1.0 part of sodium acetate precipitated after removing the acetic acid under vacuum. As hereinbefore set forth, the water washing should be conducted after vacuum removal of acetic acid. Otherwise, a considerable amount of acetic acid partitioned into the oil and water layers requiring a large sodium carbonate wash to remove acidic impurities from the oil layer and a solvent extraction of the water layer to recover the coumarin dissolved therein.

I claim as my invention:

1. The process for preparing coumarin which comprises reacting salicylaldehyde and acetic anhydride in contact with preformed alkali metal biacetate.

2. The process of claim 1 in which said alkali metal biacetate is sodium biacetate.

3. The process of claim 1 in which said biacetate is mixed sodium-potassium biacetates.

4. The process of claim 1 in which the acetic anhydride and salicylaldehyde are used in molar proportions of 2:1 to 4:1.

5. The process of claim 4 in which the salicylaldehyde and acetic anhydride are charged as a mixture.

6. The process of claim 5 in which the salicylaldehyde and acetic anhydride are charged as a mixture over a time interval of from 1–15 hours.

7. The process of claim 1 in which said biacetate is preformed in situ by reacting alkali metal acetate and acetic acid at a temperature of from about 100° to about 145° C. and the salicylaldehyde-acetic anhydride mixture is reacted at a temperature of 160° to 225° C.

8. The process of claim 7 in which said temperature of reacting the salicylaldehyde and acetic anhydride mixture is from about 170° to about 190° C.

9. The process of claim 1 in which acetic acid is distilled overhead during the reaction and the acetic anhydride coming over with the acetic acid in the overhead is replaced by substantially an equal amount of acetic anhydride, followed by additional heating at reaction temperature.

10. The process of claim 1 in which the reaction mixture is subsequently distilled under vacuum to dissociate the alkali metal biacetate and to recover acetic acid.

11. The process of claim 1 in which the reaction mixture is subsequently distilled under vacuum to remove acetic acid, and then is water washed.

12. The process of claim 1 in which the reaction mixture is subsequently distilled under vacuum to remove acetic acid, and then filtered to recover the alkali metal acetate.

References Cited

UNITED STATES PATENTS 2,204,008  6/1940  Britton et al. ____ 260—343.2 X
3,631,067  12/1971  Nankee et al. _____ 260—343.2

JOHN M. FORD, Primary Examiner